United States Patent [19]

Berkelius

[11] 3,893,203
[45] July 8, 1975

[54] DRIVE MOTOR FOR CLEANING GLASS SURFACES

[76] Inventor: Hans Berkelius, 36 Parkvagen, Taby, Sweden

[22] Filed: Aug. 5, 1974

[21] Appl. No.: 495,020

Related U.S. Application Data

[63] Continuation of Ser. No. 314,072, Dec. 11, 1972, abandoned.

[30] Foreign Application Priority Data

Dec. 22, 1971 Sweden.................................. 16496

[52] U.S. Cl. .......... 15/250.22; 15/250.3; 15/250 A; 91/229
[51] Int. Cl.[2] ..................... B60S 1/44; F01L 21/04
[58] Field of Search........ 15/250.01, 250.04, 250 A, 15/250.24, 250.26, 250.22, 250.29, 250.3; 91/224, 52, 49, 229, 235

[56] References Cited
UNITED STATES PATENTS

| 1,309,724 | 7/1919 | Folberth | 15/250.3 |
|---|---|---|---|
| 1,645,592 | 10/1927 | Folberth | 15/250.3 |
| 2,098,936 | 11/1937 | Armstrong et al. | 91/229 X |
| 2,419,859 | 4/1947 | Tarr et al. | 91/229 X |
| 2,649,078 | 8/1953 | Kelly | 91/229 X |
| 2,789,510 | 4/1957 | Meynig | 91/235 X |
| 2,862,478 | 12/1958 | Staats | 91/229 X |
| 3,233,628 | 2/1966 | Hammelmann | 91/229 X |
| 3,236,157 | 2/1966 | Lovell et al. | 91/224 |
| 3,361,036 | 1/1968 | Harvey et al. | 91/229 |
| 3,840,934 | 10/1974 | Bird | 15/250.3 |

*Primary Examiner*—Peter Feldman

[57] ABSTRACT

A drive motor for a glass cleaning device includes a cylinder having a fluid inlet at one end, a fluid outlet at its other end, and a piston slidable in said cylinder between its ends against the restraint of a spring which urges the piston toward said fluid inlet. The piston includes an overflow passage controlled by a valve member movable between open and closed positions by impact with opposing ends of the cylinder. The flow area of the inlet opening is equal to that of the overflow passage, and is substantially larger than the flow area of the fluid outlet.

2 Claims, 7 Drawing Figures

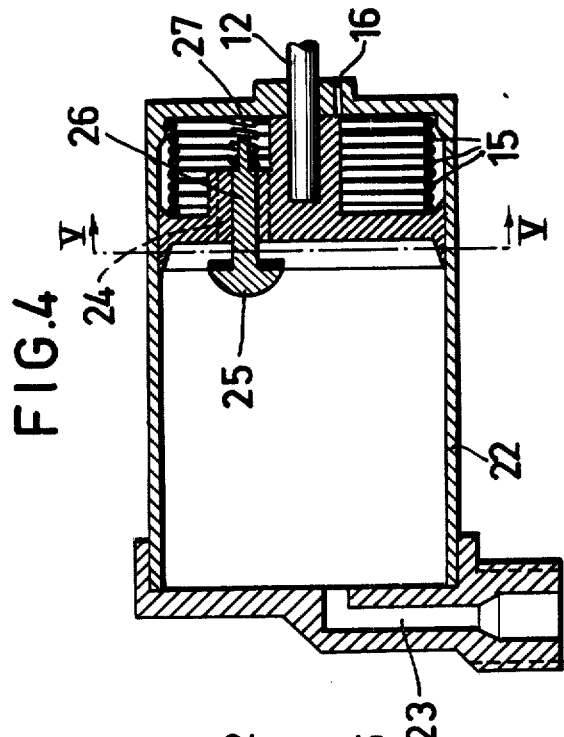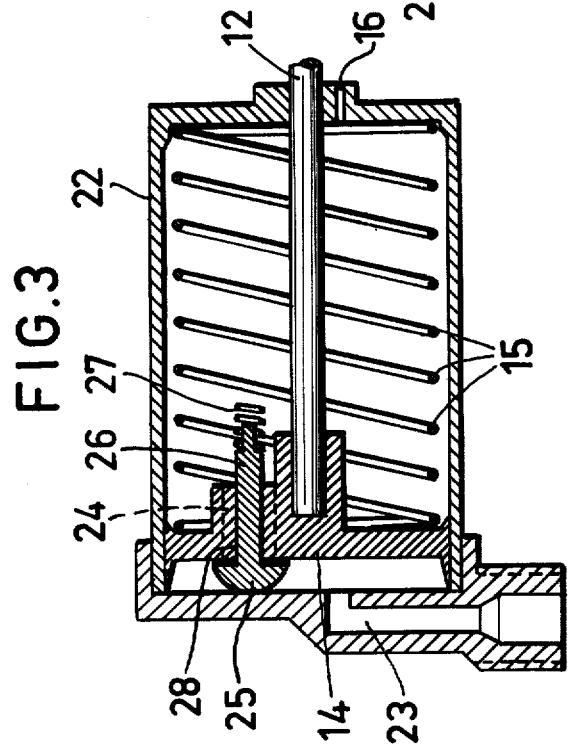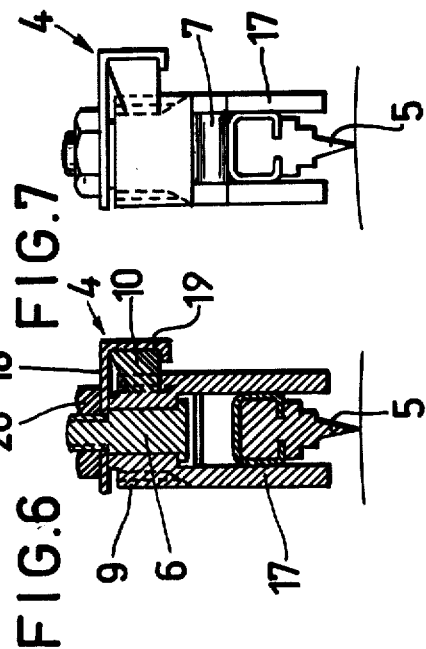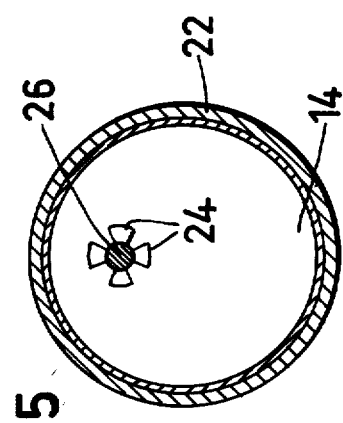

DRIVE MOTOR FOR CLEANING GLASS SURFACES

This is a continuation of application Ser. No. 314,072 filed Dec. 11, 1972 now abandoned.

This invention relates to a cleaning device for glass surfaces exposed to dirtying, comprising wiper blades performing sweeping movements across the glass surface which is to be cleaned. A washing liquid can be delivered on to the glass surface during the cleaning operation.

Devices of this kind are known particularly in the motor car industry for cleaning windscreens by causing wiper blades of rubber to move forth and back across the screen. These cleaners are combined with washing means for wetting the screen at the same time as the cleaning or scraping of dirt from the screen takes place, or independent thereof. Devices of a similar kind also have been proposed and constructed to be used for cleaning the headlamp discs of motor cars.

The present invention has as its object to provide a drive motor for wiper blades adapted to clean glass surfaces of the most varying forms. The invention is specially intended for use in the cleaning of headlamp discs and has the advantage of being mountable in a simple way on all commercially available motor car headlamps. The invention, compared with known devices, is also adapted for mass production, and the manufacturing costs are substantially lower than for conventional devices of a similar kind. The device, furthermore, works under severe climatic conditions and has no electric conduits nor long levers with guide edges.

The characterizing features resulting in a device with the aforesaid advantages will become evident from the attached claims. One embodiment of the invention is described in the following specification with reference to the accompanying drawing figures, wherein:

FIG. 3 is a cross-section through the drive motor of the device on a larger scale than the corresponding details in FIG. 1.

FIG. 4 shows the drive motor of FIG. 3, but with the drive piston in a different position.

FIG. 5 is a cross-section taken on line V—V of FIG. 4.

FIG. 6 is a cross-section taken on line VI—VI of FIG. 1, and

FIG. 7 is a cross-section taken on line VII—VII of FIG. 1.

Figure 1:
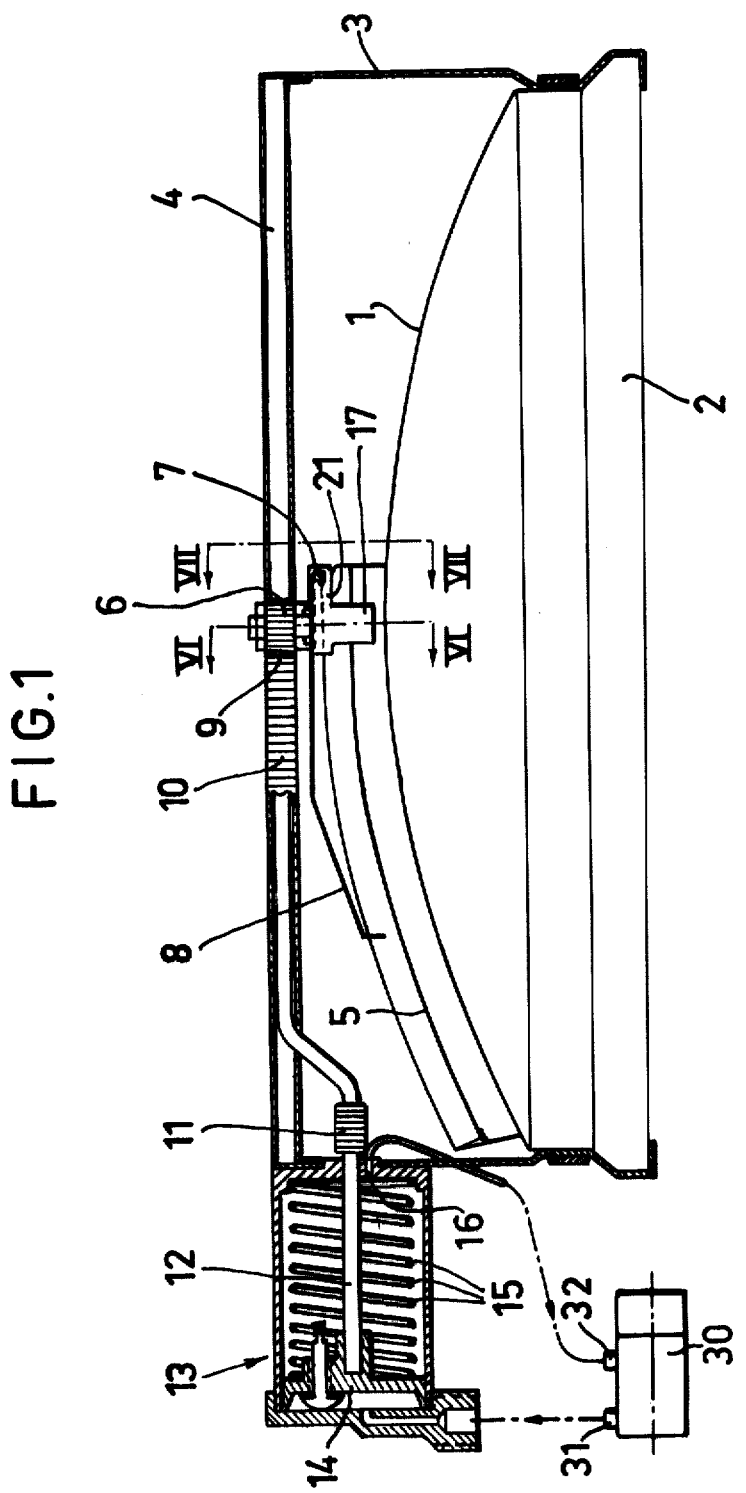
FIG. 1 is a cross-section of the driving and cleaning device mounted on a headlamp disc.

In FIG. 1 a headlamp disc 1 is shown inserted in a mounting 2. About the mounting 2 a circular frame 3 supporting the cleaning device can be secured by clamping or in another way. Within the frame 3, preferably at its outer edge, extends diametrically a frame piece 4 which, in its middle and at the center of the headlamp disc, supports a rotatable wiper blade 5. The wiper blade 5 is mounted in the frame piece 4 by means of an axle 6. The mounting between the wiper blade 5 and the axle 6 consists of a spring joint 7, and the wiper blade 5 is pressed against the headlamp disc 1 by means of a thrust spring 8. The axle 6 supports a cogwheel 9 rigidly connected with the axle, and the cogwheel 9 preferably is located on the upper surface of the frame piece 4, see FIG. 1. Above the frame piece 4 and in its longitudinal direction a movable rack 10 is provided which engages with the cogwheel 9, and said rack 10 is restrained and guided for motion along the frame piece 4. Said frame piece 4 may have a U-shaped cross-section, with its legs facing the headlamp disc 1, so that the rack extends between the frame-piece legs and towards that side of the frame piece which faces the headlamp disc. The frame piece may instead have, for example, an L-shaped cross-section with the rack being located in an angle between the web and the leg.

Figure 2:
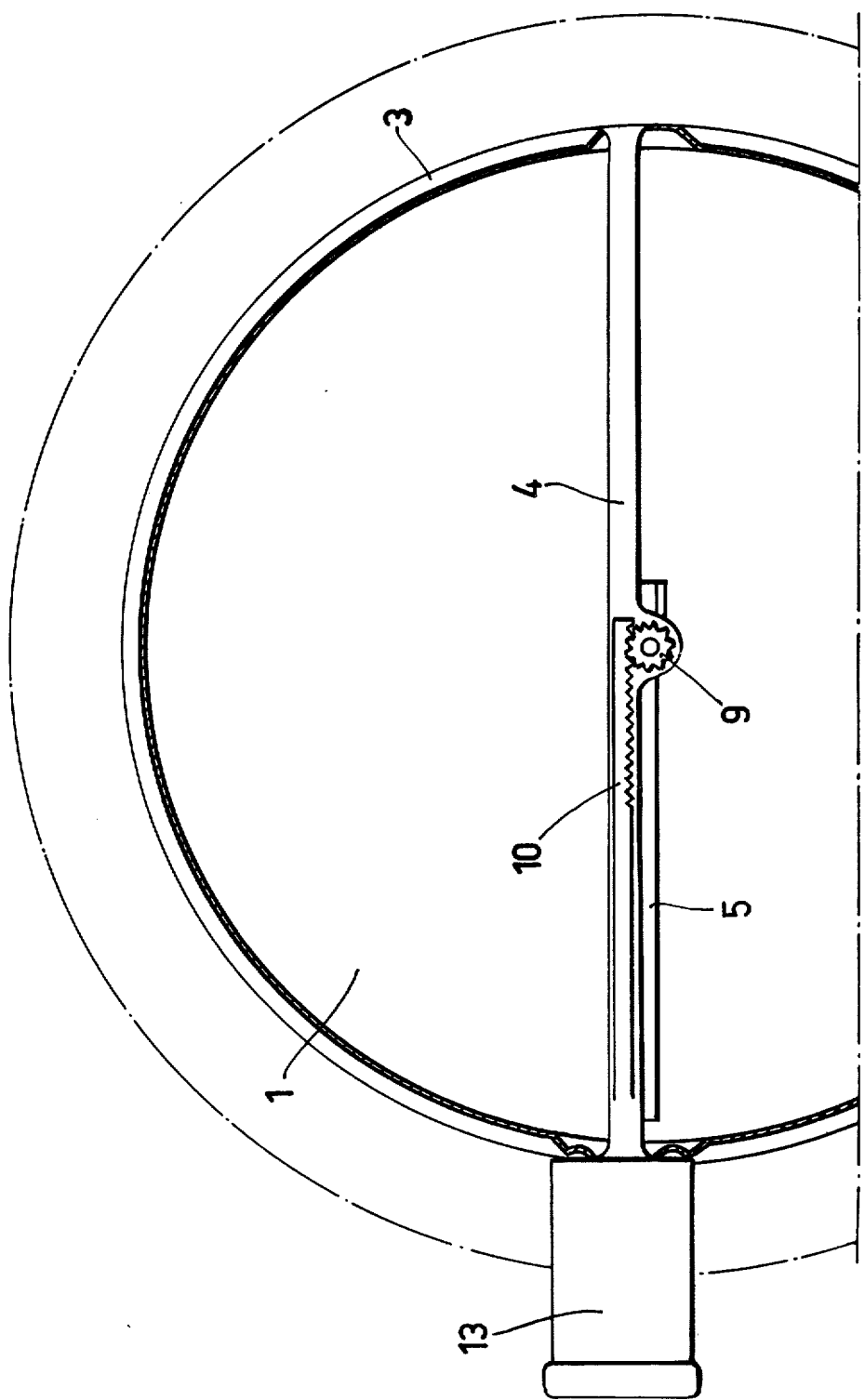
FIG. 2 is a partial plan view of the device depicted in FIG. 1.

One end of rack 10 is located at the end of the frame piece and, thus, outside the frame 3 proper, and is connected by a joint 11 with a piston rod 12 associated with a double-acting hydraulic piston motor designated generally by 13. The mode of operation for the hydraulic piston motor will be described in greater detail in the following with reference to FIGS. 3 and 4, but briefly it may be mentioned that the hydraulic motor 13 is driven by fluid pressure which urges the piston rod 12 via the piston 14 to the right and against the action of spring 15, in such a manner, that the rack 10 is moved to the right in FIG. 1 and turns the cogwheel 9 whereby the wiper blade 5 is rotated and cleans the disc 1. The cogwheel 9 performs one revolution for a full swing of the piston rod 12 and thereby drives the wiper blade through 360° about the headlamp disc. The compression spring 15 effects the return movement, and the wiper blade, therefore, returns to its starting position, as shown in FIGS. 1 and 2.

FIGS. 6 and 7 show different cross-sections through the cleaning device of FIG. 1. The axle 6, for example, in FIG. 1 is shown to support a sleeve 17, which is connected stiff against rotation with the axle 6. The cogwheel 9 is mounted on said sleeve 17 or it may, if desired, be made integral with the sleeve 17. The rack 10 meshes with the cogwheel 9 and is located beneath the web 18 of the frame piece 4 and against the leg 19 of the frame piece 4 (see FIG. 6). The sleeve 17 supports the wiper blade 5, and the axle 6 is thus supported rotatably by the web 18 and locked by the nut 20 on the upper side of the frame piece 4. The sleeve 17 is provided with a projection 21, see FIG. 1, which supports the wiper blade 5 and the thrust spring 8. See also FIG. 7.

FIG. 3 depicts on a larger scale than in FIG. 1 the hydraulic motor 13 which comprises a cylinder 22 having in its left-hand end wall an inlet opening 23 for pressure fluid. A return opening 16 is provided in the right-hand end wall of the cylinder 22. The piston 14 is slidable within cylinder 22 and is supported on the piston rod 12, which is connected with the rack 10. The pressure of the fluid supplied to inlet 23 causes the piston to be moved to the right in a working stroke against the action of the pressure spring 15. Within the piston an overflow passage 24 is provided which is held closed by a valve cone 25 due to the pressure acting upon the cone side facing to the left, i.e., facing the fluid inlet opening 23. The closing proper of the overflow passage 24 is effected when the cone 25, in the left-hand end position of the piston 14 contacts the left inside end of the cylinder 22. The valve cone 25 has a pin 26, which at its end supports a spring 27 and in the right-hand position of the piston pushes the spring 27 against the right inside end of the cylinder 22 whereby the valve cone 25 opens the passageway 24. This position is shown in FIG. 4. FIG. 5 shows a cross-section through the piston 14 from which is evident that the overflow passage 24 comprises four passageways of star-shaped arrangement spaced about the guidance surfaces 28 for the pin 26 of the valve cone. The flow area of passage 24, when it is opened, corresponds to the flow area of inlet opening 23 and substantially exceeds the flow area of return opening 16.

The operation of the hydraulic motor is as follows. The pressure of the pressure fluid entering through the inlet 23 presses the piston 14 to the right against the action of the compression spring 15. The valve 25 is closed. When piston 14 reaches its right-hand end position the valve 25 is opened since the spring end 27 impacts against the right end wall of the cylinder 22. The spring 27 thereby presses the valve cone 25 away from the left-hand side of piston 14 so that a wide gap is opened between the valve cone 25 and the piston 14. The size of the gap exceeds substantially the cross-sectional area for the return opening 16 and is substantially equal with the total area for the overflow passage 24. Due to the fact that the overflow passage 24 is opened when the piston is in its right-hand position, the spring 15 can move the piston 14 in a return stroke back toward its left-hand position in spite of the pressure of the fluid which is still entering through the inlet 23. In this way the same pressure is obtained on both sides of the piston 14 and, therefore, the fluid can flow out through the return opening 16 when the piston 14 returns to its left-hand position. When the piston 14 has arrived at its left-hand position, the valve cone 25 contacts the left-hand end wall of the cylinder 22, and the cone 25 closes the overflow passage 24. The valve cone surface, which is actuated by the pressure in the fluid on the left-hand side of piston 14, is larger than the area exposed to the pressure of the fluid on the right-hand side of piston 14. Consequently, during the power stroke of piston 14 in the right-hand direction the valve cone is held closed, and on the right-hand side of piston 14 a decrease in pressure takes place owing to the outflow of fluid through the return opening 16. It is to be observed, thus, that fluid returns through the return opening 16 all the time when the hydraulic motor is in operation. The fluid pressure is produced in any suitable way, and in FIG. 1 is shown in a schematic way an electrically operated pump 30 with outlet 31 and return inlet 32, which is connected with the return opening 16 of the hydraulic piston motor 13. The electrically operated pump may be located in a protected manner to ensure its function. Between the pump 30 and the hydraulic piston motor 13 a small pressure vessel for the fluid may be inserted.

One of the advantages not mentioned of the invention is, that it can be manufactured of a material insensitive to temperature variations and corrosion attacks. The device according to the invention, at least all of its external details, may be manufactured of plastic material. The invention, furthermore, requires very little space and does not shield off the headlamp disc so as to deteriorate the light effect from the headlamp. The hydraulic piston motor can be given very small dimensions and a high operation safety. It also is very simple to mount the entire device on such headlamp frames or cases which at present are used on motor cars.

Within the scope of the invention also other embodiments of the hydraulic piston motor are contemplated which, for example, may be provided with a rotary driven piston instead of a reciprocating one. The rack may be provided with screw threads so as to transfer the rotation of the piston into a sweeping motion of the wiper blade 5. The invention, furthermore, can be applied to forms of headlamp discs other than the circular one described and shown in the Figures. Triangular or other shapes of headlamp discs, for example, may be used, and it may be suitable to make the wiper blade sweep with a deflection smaller than 360°. The wiper blade, for example, may be pivotally mounted in a corner of a triangular headlamp disc to swing forth and back with a deflection angle corresponding to the angle of the headlamp disc where the sweeping movement for the wiper blade has its center.

What is claimed is:

1. A drive motor for operating a cleaning device of the type having at least one wiper blade mounted for movement adjacent a glass surface to be cleaned and adapted to be driven by the drive motor across the glass surface to clean said surface, said drive motor comprising a hydraulic cylinder having a liquid inlet opening adjacent one end thereof and a liquid outlet opening adjacent the other end thereof, means for supplying liquid under pressure to said inlet opening and for receiving a return of liquid from said outlet opening, said liquid inlet opening having a flow area which is substantially greater than the flow area of said outlet opening, a slidable piston located within said cylinder for reciprocating movement, means connecting said slidable piston to said wiper blade of said cleaning device, said connecting means including rack and pinion means for converting reciprocating motion of said piston to rotary motion of said wiper blade, spring means between said piston and said cylinder for resiliently urging said piston toward said one end of said cylinder, said piston having a surface extending across said cylinder which surface is always in direct communication with said liquid inlet opening and continually exposed to the liquid under pressure at said inlet opening whereby said piston is movable against the restraint of said spring means toward said other end of said cylinder in response to forces exerted upon said piston by liquid pressure applied to said liquid inlet opening, said piston including an overflow passage extending therethrough for selectively equalizing the pressure on opposite sides of said piston, a valve member disposed adjacent said overflow passage, said valve member being operated by impact with a predetermined portion of said cylinder to open said overflow passage in response to movement of said piston in a working stroke from said one end to said other end of said cylinder, and said valve member thereafter being operated in the opposite direction by impact with a different portion of said cylinder to close said overflow passage in response to subsequent movement of said piston by said spring means in a return stroke from said other end to said one end of said cylinder, said overflow passage when open having a flow area substantially equal to the flow area of said liquid inlet opening and substantially greater than the flow area of said outlet opening, whereby the speed of movement of said piston is substantially the same during both said working stroke and said return stroke and is dependent upon the comparatively small flow area of said liquid outlet opening.

2. The drive motor of claim 1 wherein said valve member comprises an elongated pin extending through said overflow passage in a direction substantially parallel to the direction of movement of said piston in said cylinder, one end of said pin being provided with an enlarged head on the side of said piston facing said liquid inlet opening, said head being positioned and dimensioned to selectively impact said one end of said cylinder as said piston completes its return stroke thereby to close said overflow passage, the other end of said pin being provided with a spring positioned to engage the other end of said cylinder as said piston completes its working stroke to move said pin and head away from said other end of said cylinder thereby to open said overflow passage.

* * * * *